Jan. 16, 1940.    O. ALVISTUR    2,187,295
AIRPLANE
Filed May 11, 1938    2 Sheets-Sheet 1
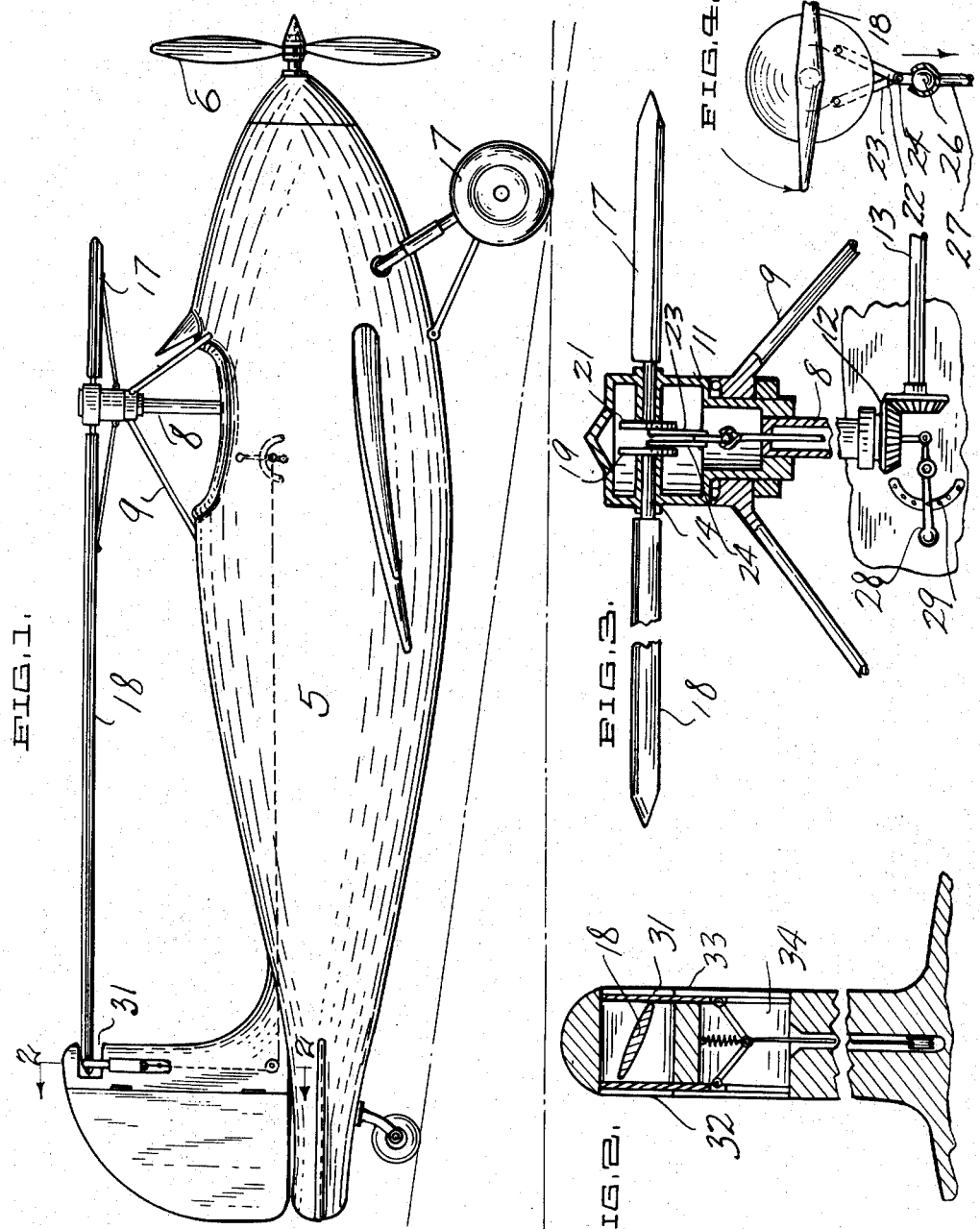
INVENTOR:
OSCAR ALVISTUR.
BY
ATTORNEYS Jan. 16, 1940.　　　　O. ALVISTUR　　　　2,187,295
AIRPLANE
Filed May 11, 1938　　　2 Sheets-Sheet 2
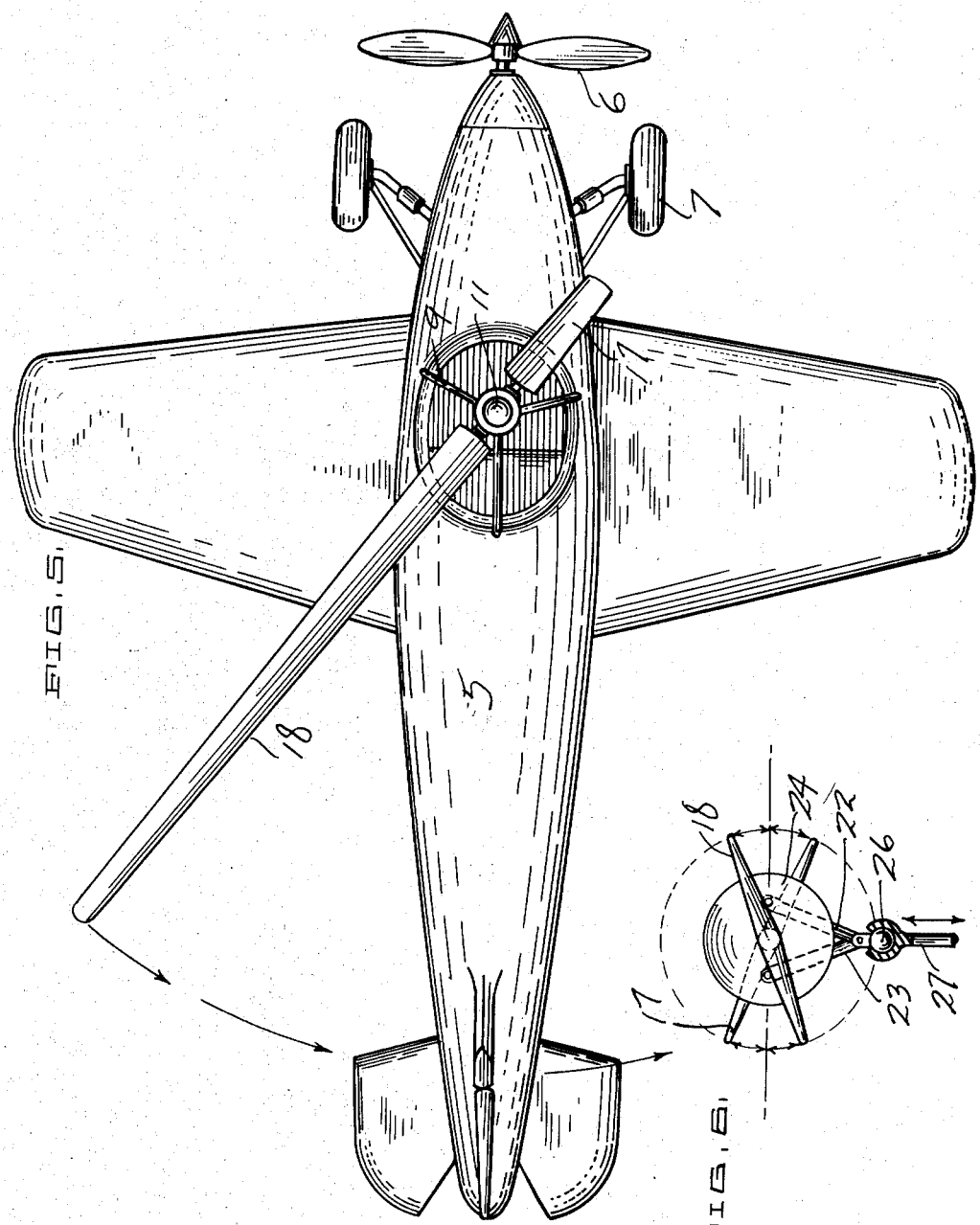
INVENTOR:-
OSCAR ALVISTUR
BY
ATTORNEYS.

Patented Jan. 16, 1940

2,187,295

UNITED STATES PATENT OFFICE 2,187,295

AIRPLANE

Oscar Alvistur, San Francisco, Calif.

Application May 11, 1938, Serial No. 207,391

1 Claim. (Cl. 244—6)

This invention relates to improvements in airplanes and has particular reference to a method of propelling the vehicle through the air.

The principal object of this invention is to provide helicopter means which may be used to assist in elevating the airplane off the ground or in landing without necessitating a large area in which to manipulate.

A further object is to produce a device of this character wherein the helicopter portion may be effectively locked out of operation when the same is not in use.

A still further object is to provide means for varying the angle of incidence of the helicopter blades.

Other objects and advantages will be apparent during the course of the following description.

In the accompanying drawings forming a part of this specification and in which like numerals are employed to designate like parts throughout the same, Fig. 1 is a side elevation of my device;

Fig. 2 is an enlarged fragmentary detailed view taken on the line 2—2 of Fig. 1;

Fig. 3 is an enlarged fragmentary detailed view of the means for varying the helicopter vanes as to angle of incidence;

Fig. 4 is a diagrammatic view showing the manner in which the helicopter blades vary in unison;

Fig. 5 is a top plan view of Fig. 1; and

Fig. 6 is a detailed view similar to Fig. 4, showing the helicopter blades at varying angles.

The ordinary airplane is propelled forwardly by a propeller which either pulls or pushes the airplane. With this type of vehicle it is necessary that the same take a long run in order to provide air resistance beneath the wings to lift the vehicle off the ground. By providing a helicopter arrangement the distance that the vehicle must move forward is greatly reduced for the reason that the helicopter tends to lift the vehicle. However, when the vehicle is in the air, and it is desired to move forwardly, the helicopter has a retarding effect; and, consequently, it is advantageous to provide means for locking the helicopter blades in such a position that said blades will produce a minimum amount of air resistance during the forward movement of the plane.

In the accompanying drawings wherein for the purpose of illustration is shown a preferred embodiment of my invention, the numeral 5 designates the body of a vehicle having the usual propeller 6 and landing gear 7.

My invention consists in providing a vertical shaft 8, suitably placed as shown at 9, and carrying a revolving head 11 which is rotated by the shaft 8. The shaft is in turn driven through suitable gears 12 and a shaft 13 connected to the motor of the vehicle. Rotatably positioned in the head 11 are axles 14 and 16. The axle 16 carries a short counterweighted blade 17, while the axle 14 carries a long blade 18. Secured to the adjacent ends of the axles 14 and 16 are discs 19 and 21 respectively. Links 22 and 23 are in turn pivoted to the discs 19 and 21 respectively and have their free ends joined as at 24 to a ball 26, which ball is connected by a pull rod 27 to a lever 28, movable over a segment 29. Consequently, when the lever 28 is moved from the position where the blades are in alignment with each other, as shown in Fig. 4, to the position shown in Fig. 6, the blades will be moved out of alignment with each other in a manner which is obvious.

In order to lock the blades 17 and 18 in alignment with the movement of the vehicle, I provide a slot 31 in the tail section and a pair of sliding pins 32 and 33, which are moved across the slot or withdrawn therefrom through a cable 34 operated through a lever in the cockpit of the vehicle.

The result of this construction is that when the device is in operation, as shown in Fig. 5, the helicopter blades will rotate about the axis of the shaft 8 and assist in raising the vehicle from the ground. When it is desired to move straightaway, the blades are placed in alignment with each other, as shown in Fig. 4, and also in alignment with the direction of movement of the vehicle through the air. At this time, the free end of the blade 18 will lie in the position of Figs. 1 and 2. At the same time, the pins 32 and 33 may be released so as to move upwardly and lock the helicopter blades in stationary alignment with the vehicle.

It will thus be seen that my device will materially assist in the operation of an airplane by enabling it to take off easier, land easier, and have greater speed while in the air than is possible with the ordinary helicopter arrangement.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In combination with an airplane having forward propelling means, of a vertical shaft mounted thereon, means for rotating said shaft, a pair of blades of unequal length rotated by said shaft about the axis thereof, means for rotating said blades about an axis at right angles to the axis of rotation of the shaft, means for locking said blades against rotation about said shaft, said means comprising a pair of pins carried by the tail of the plane and normally held out of the line of movement of said blades, means for moving said pins into alignment with the movement of said blades, whereby said pins will lie on the opposite side of the longer of said blades, and means for actuating said pins from a remote point in the cockpit of the plane.

OSCAR ALVISTUR.